Sept. 4, 1923.
E. B. CROCKER
GAUGE CASE
Original Filed April 12, 1920
1,466,790
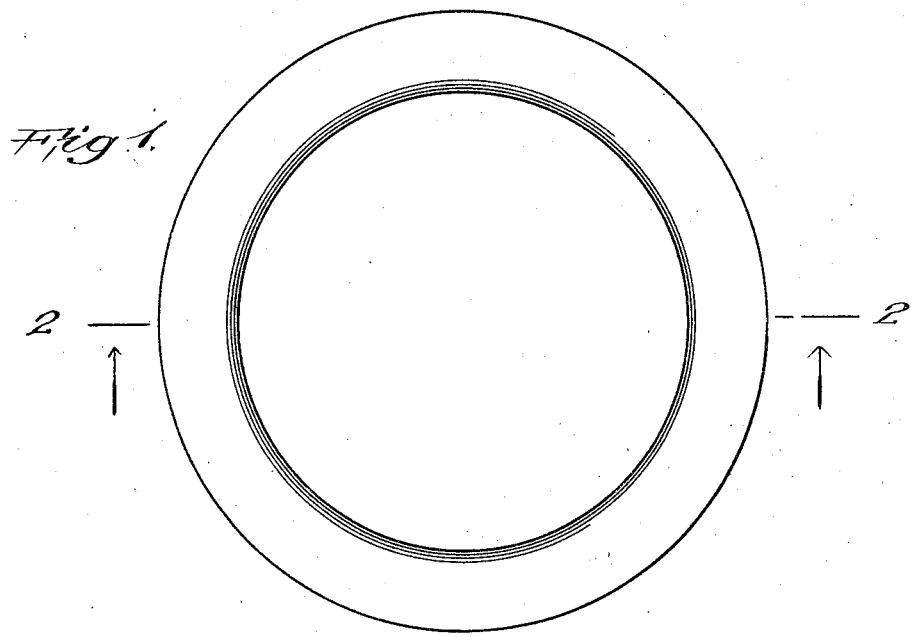
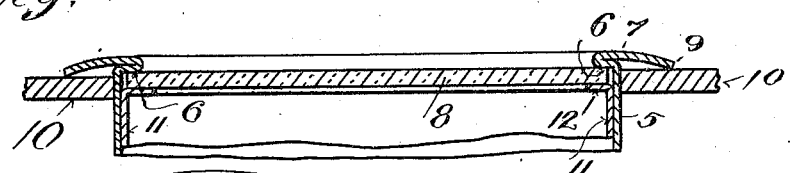
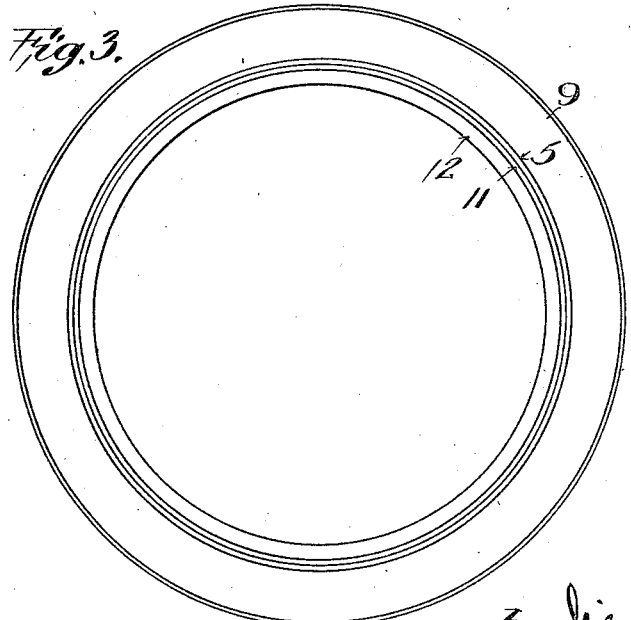
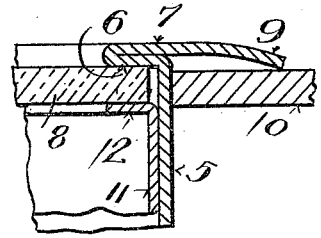
Inventor
Ernest B. Crocker
by his atty Samuel E. Darby Patented Sept. 4, 1923.

1,466,790

UNITED STATES PATENT OFFICE.

ERNEST B. CROCKER, OF STRATFORD, CONNECTICUT, ASSIGNOR TO MANNING, MAXWELL & MOORE, INC., OF NEW YORK, N. Y., A CORPORATION OF NEW JERSEY.

GAUGE CASE.

Application filed April 12, 1920, Serial No. 373,141. Renewed July 14, 1923.

*To all whom it may concern:*

Be it known that I, ERNEST B. CROCKER, a citizen of the United States, residing at Stratford, in the county of Fairfield, State of Connecticut, have made a certain new and useful Invention in Gauge Cases, of which the following is a specification.

This invention relates to guage cases.

The object of the invention is to produce a gauge case which is simple in structure, economical to manufacture and which is efficient in use.

A further object of the invention is to so form the gauge case as to provide an inwardly extending fold to constitute a retaining flange for the glass or other form of transparent cover plate, one layer of such fold being extended radially outwardly to constitute a lateral rim flange to support the case upon an instrument board.

The invention consists substantially in the construction, combination, location and relative arrangement of parts, all as will be more fully hereinafter set forth, as shown in the accompanying drawing, and finally pointed out in the claims.

Referring to the accompanying drawing,—

Fig. 1 is a front end view of a gauge case embodying my invention.

Fig. 2 is a central longitudinal section on the line 2, 2, Fig. 1, looking in the direction of the arrows.

Fig. 3 is a rear end view.

Fig. 4 is a broken view in longitudinal section, on the same plane as Fig. 2, but somewhat enlarged.

In carrying out my invention I form the gauge or instrument case out of metal which, at one end of the skirt or body portion 5 is bent or folded inwardly, as at 6, and then outwardly upon the portion 6, as at 7, thereby forming a radial inwardly extending flange against the under or inner surface of which the glass or other form of transparent cover plate 8 is retained and held. The portion 7 of the fold is extended radially beyond the outer surface of the skirt portion 5, as at 9, to form a flange by which the case may be retained on an instrument board or other support, indicated at 10. The glass cover plate 8 may be retained against the inner surface of the shoulder or flange formed by the fold 6, 7, in any suitable manner to effect a water or moisture tight and dust proof joint. A simple arrangement is shown wherein a ring member 11 is fitted tightly within the skirt portion 5 of the case and is formed with an inwardly extending flange 12 at its outer edge. The edge of the glass cover is received and securely and tightly held in place between the flanges 12 and 6.

From the foregoing it will be seen that I provide an exceedingly simple, effective and economical structure of gauge or other instrument case, and which is strong and durable and composed of few parts, and I secure great economy of manufacture in that I avoid the necessity of machine work in turning screw threads and constructing the usual bezels and screw caps, for the front ends of such cases.

Having now set forth the objects and nature of my invention, and a structure embodying the principles thereof, what I claim as new and useful, and of my own invention, and desire to secure by Letters Patent is:

1. A gauge or other instrument case constructed of metal, one end of the skirt portion being bent inwardly, and then folded outwardly upon itself to form a retaining flange for the glass or other cover plate, the outwardly bent or folded portion being extended beyond the outer surface of the skirt portion and lying in approximately the plane of said retaining flange to form an annular supporting flange for the case.

2. In a gauge or other instrument case constructed of metal, a skirt portion, the metal at one end of said skirt portion being bent inwardly and then folded outwardly upon itself to form an inwardly extending flange, in combination with a cover plate, and a flanged ring member fitting within the skirt portion and serving to clamp and retain the cover plate in position against the flange formed at the end of the skirt portion.

In testimony whereof I have hereunto set my hand on this 30th day of March, A. D., 1920.

ERNEST B. CROCKER.